(12) United States Patent
Otsubo (10) Patent No.: US 10,288,402 B2
(45) Date of Patent: May 14, 2019

(54) INDUSTRIAL MACHINE

(71) Applicant: MITUTOYO CORPORATION, Kanagawa (JP)

(72) Inventor: Seiichi Otsubo, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 163 days.

(21) Appl. No.: 15/622,509

(22) Filed: Jun. 14, 2017

(65) Prior Publication Data

US 2017/0363401 A1    Dec. 21, 2017

(30) Foreign Application Priority Data

Jun. 16, 2016 (JP) .................................. 2016-119797

(51) Int. Cl.
*G01B 5/008* (2006.01)
*G01B 11/16* (2006.01)
*G01B 5/00* (2006.01)

(52) U.S. Cl.
CPC ........... *G01B 5/008* (2013.01); *G01B 5/0004* (2013.01); *G01B 11/16* (2013.01)

(58) Field of Classification Search
CPC ................................ G01B 5/008; G01B 11/16
USPC .................................................. 33/503, 707
See application file for complete search history.

(56) References Cited

U.S. PATENT DOCUMENTS

| | | | | |
|---|---|---|---|---|
| 5,711,084 A * | 1/1998 | Spanner | ............. | G01D 5/34707 33/702 |
| 2010/0242295 A1* | 9/2010 | Tomiya | ............. | G01D 5/34707 33/700 |
| 2011/0313706 A1 | 12/2011 | Kawamura et al. | | |
| 2012/0029857 A1* | 2/2012 | Ono | ....................... | G01B 5/008 702/95 |
| 2012/0067039 A1* | 3/2012 | Fukuda | .................. | G05B 19/44 60/459 |
| 2013/0227850 A1* | 9/2013 | Singh | ..................... | G01B 5/008 33/502 |
| 2014/0068958 A1* | 3/2014 | Kubo | ..................... | G01B 5/016 33/559 |
| 2014/0182150 A1* | 7/2014 | Nishikawa | ............... | G01B 5/20 33/503 |
| 2015/0276366 A1* | 10/2015 | Emtman | ................ | G01B 3/205 33/701 |
| 2018/0328705 A1* | 11/2018 | Sprenger | .............. | G01B 21/042 |

FOREIGN PATENT DOCUMENTS

JP         2012-2715      1/2012

* cited by examiner

*Primary Examiner* — George B Bennett
(74) *Attorney, Agent, or Firm* — Greenblum & Bernstein, P.L.C.

(57) ABSTRACT

A coordinate measurement machine includes a column that can move relative to a placement surface on which a workpiece is placed, a guide part that is provided on the placement surface, the guide part guiding the column, a scale of a linear encoder that is supported on a side surface of the guide part, and detectors that are provided on the column, the detectors detecting a relative displacement with respect to the scale. The detectors detect a displacement of the column in each of a moving direction and a vertical direction. A coordinate measurement machine further includes a deformation amount acquisition part that acquires an amount of deformation of the guide part relative to the scale on the basis of detection results of the detectors.

10 Claims, 11 Drawing Sheets

INDUSTRIAL MACHINE

CROSS-REFERENCE TO RELATED APPLICATIONS

The present application claims priority to Japanese Patent Application number 2016-119797, filed on Jun. 16, 2016. The content of this application is incorporated herein by reference in its entirety.

BACKGROUND OF THE INVENTION

The present invention relates to an industrial machine.

As an industrial machine, for example, a coordinate measurement machine, which moves in orthogonal three-axis directions to measure coordinates and the like of a workpiece (an object to be measured), is used. In the coordinate measurement machine, the workpiece is measured by a probe while a movable body, which supports the probe, moves along a guide part of a base in a state where the workpiece is placed on a placement surface of the base.

The base may be deformed when the workpiece is placed on the placement surface. For example, due to a load of the workpiece, the guide part of the base may be bent and deformed. In such a case, because the movable body moves on the bent guide part, an error occurs in the result of the measurement of the workpiece by the probe supported by the movable body. In order to correct such an error, there is a demand to appropriately obtain the amount of deformation of the guide part.

BRIEF SUMMARY OF THE INVENTION

This invention focuses on these points, and an object of the invention is to easily and with high accuracy obtain the amount of deformation of the guide part due to a load of a workpiece.

In one aspect of the present invention, an industrial machine is provided, which comprises a movable body that can move relative to a placement surface on which a workpiece is placed, a guide part that is provided on the placement surface, the guide part guiding the movable body, a scale of a linear encoder that is supported on a side surface of the guide part, detectors that are provided on the movable body, the detectors detecting a relative displacement with respect to the scale and a displacement of the movable body in each of a moving direction and a vertical direction, and a deformation amount acquisition part that acquires an amount of deformation of the guide part relative to the scale on the basis of detection results of the detectors.

DETAILED DESCRIPTION OF THE INVENTION

<Configuration of a Coordinate Measurement Machine>

A configuration of a coordinate measurement machine 1, which is an example of an industrial machine according to one exemplary embodiment of the present invention, is described with reference to FIG. 1.

Figure 1:
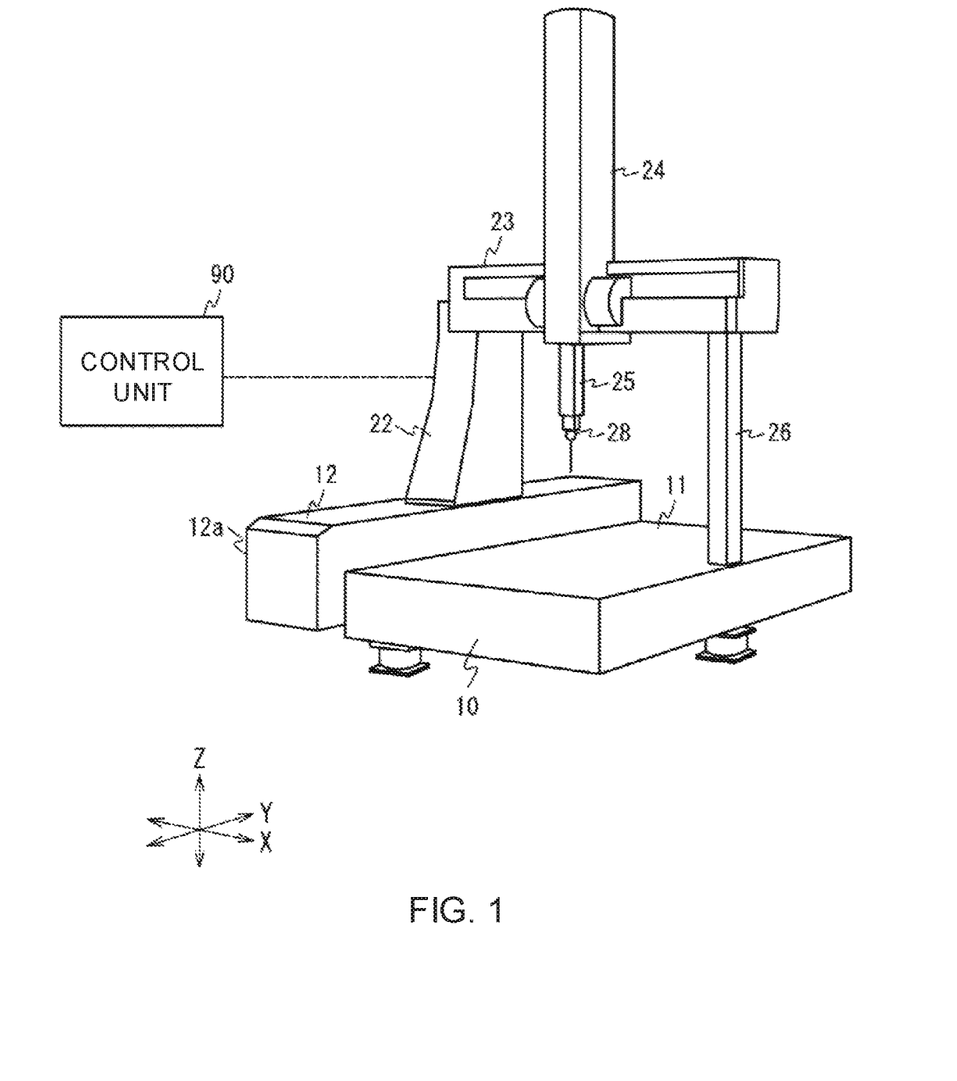
FIG. 1 is a perspective view showing an example of an outer configuration of a coordinate measurement machine 1 according to one exemplary embodiment of the present invention.

FIG. 1 is a perspective vie showing an example of an outer configuration of the coordinate measurement machine 1 according to one exemplary embodiment. As shown in FIG. 1, the coordinate measurement machine 1 includes a base 10 and a moving mechanism 20.

As shown in FIG. 1, the base 10 is formed with a rectangular plate shape. The base 10 herein is made of stone, but it is not so limited. The base 10 is supported by a stand (a stand 60 shown in FIG. 2). Further, the base 10 includes a placement surface 11 on which a workpiece, which is an object to be measured, is placed.

On one end side in the X-axis direction of the base 10, a guide part 12 is provided on the placement surface 11 along the Y-axis direction. The guide part 12 guides the movement of the moving mechanism 20 (specifically, the column 22 of the moving mechanism 20) in the Y-axis direction. Further, on a side surface 12a of the guide part 12, a linear encoder (FIG. 2), which will be described later, is provided.

The moving mechanism 20 moves a probe 28, which is attached to the tip of the ram 25, in the directions of the X-axis, the Y-axis, and the Z-axis. The moving mechanism includes a column 22, a beam 23, a slider 24, and the ram 25. Further, the moving mechanism includes a drive part 29 (see FIG. 6) for driving the column 22, the slider 24, and the ram 25.

The column 22 stands on the guide part 12. The column 22 can move on the guide part 12 along the Y-axis direction due to the drive part 29. In the present exemplary embodiment, the column 22 corresponds to a movable body that can move relative to the placement surface 11, on which the workpiece is placed.

The beam 23 extends in the X-axis direction. One end side in the longitudinal direction of the beam 23 is supported by the column 22, and the other end side in the longitudinal direction of the beam 23 is supported by the support column 26. The beam 23 moves in the Y-axis direction together with the column 22.

The slider 24 is supported by the beam 23 and is formed with a tubular shape along the Z-axis direction. The slider 24 can move on the beam 23 along the X-axis direction due to the drive part 29.

The ram 25 is inserted into the slider 24 and moves in the X-axis direction together with the slider 24. Further, the ram 25 can move inside of the slider 24 along the Z-axis direction due to the drive part 29.

In the coordinate measurement machine 1, the base 10 may be deformed in some cases. For example, the base 10 is bent due to the load of the workpiece placed on the placement surface 11 of the base 10. Further, when the base 10 is a base made of stone, the base 10 bends, bulges, or is dented because the temperature distribution of a stone is biased as the temperature changes. Furthermore, some stones have the feature of absorbing moisture, and the base 10 may bulge or be dented due to moisture ingress and egress.

When the base 10 is deformed, the guide part 12 of the base 10 is also deformed. When the guide part 12 is deformed, the column 22 moves on the guide part 12 in a deformed state, and so an error occurs in the result of measurement of the workpiece by the probe 28 supported via the column 22.

On this issue, in the present exemplary embodiment, a linear encoder 50, which will be described later, obtains the amount of deformation of the column 22 due to the deformation of the base 10 including the guide part 12. And, the control unit 90, which will be described later, acquires the amount of deformation of the guide part 12 on the basis of the amount of deformation of the column 22, and corrects the straightness error and the angular error. This makes it possible to correct errors with high accuracy.

<Configuration of the Linear Encoder>

The detailed configuration of the linear encoder 50, which is provided on the side surface 12a of the guide part 12, is described with reference to FIG. 2.

Figure 2:
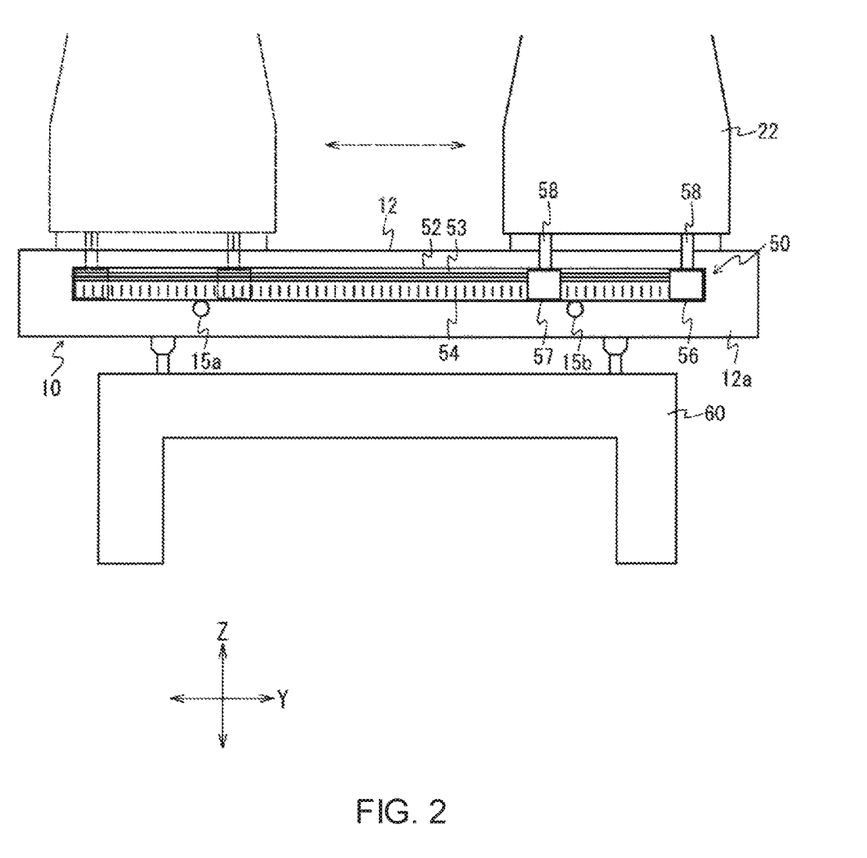
FIG. 2 is a diagram for describing a configuration of a linear encoder 50.

FIG. 2 is a diagram for describing a configuration of the linear encoder 50. The linear encoder 50 detects displacement in the moving direction (the Y-axis direction) and the vertical direction (the Z-axis direction) of the column 22 supported by the guide part 12. The linear encoder 50 includes a scale 52 and detectors 56 and 57.

The scale 52 is made of, for example, glass and is supported by the side surface 12a of the guide part 12. The scale 52 is not fixed to the side face 12a and is supported by two support parts 15a and 15b provided on the side face 12a. The two support parts 15a and 15b are separated by a predetermined distance in the Y-axis direction and support the bottom surface of the scale 52 at a point.

Figure 3A:
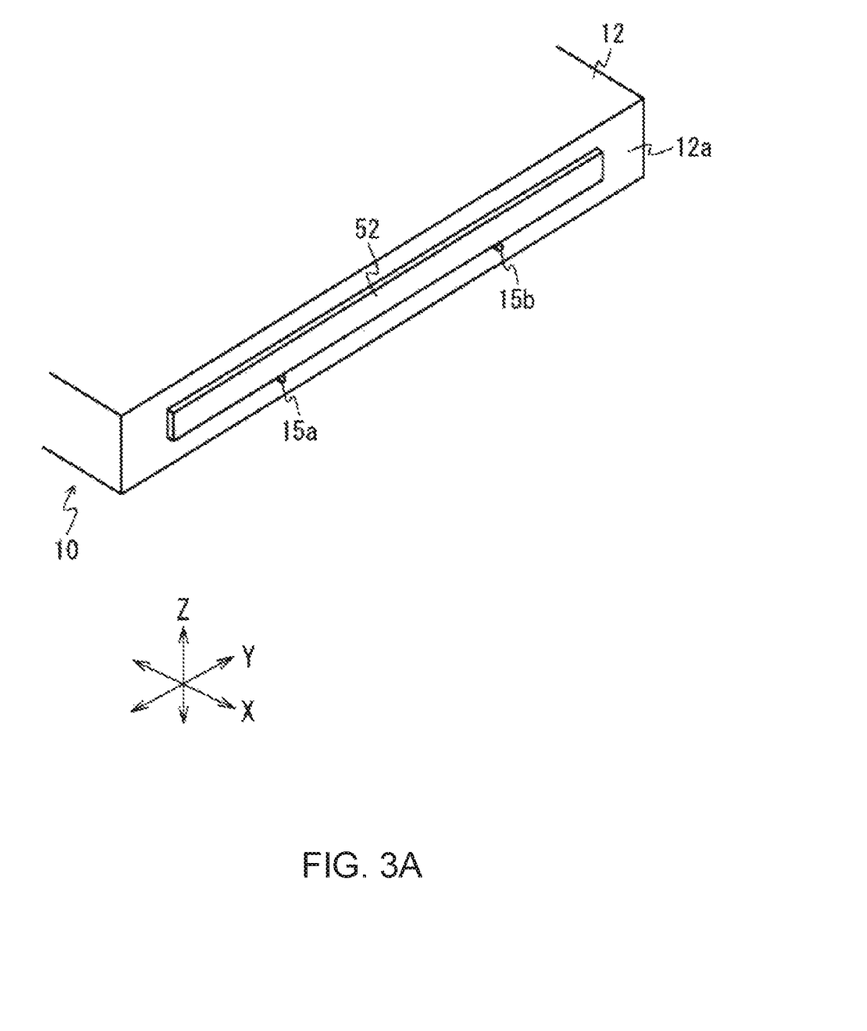
FIG. 3A is a diagram for describing configurations of support parts 15a and 15b that support a scale 52.

FIG. 3A is a diagram for describing configurations of the support parts 15a and 15b that support the scale 52. Here, the two support parts 15a and 15b are shaft-like pins. The support part 15a of the two support parts 15a and 15b is a non-constraining support part that supports the scale 52 without constraining the scale 52, and the support part 15b is a constraining support part that supports the scale 52 and constrains the scale 52.

Figure 3B:
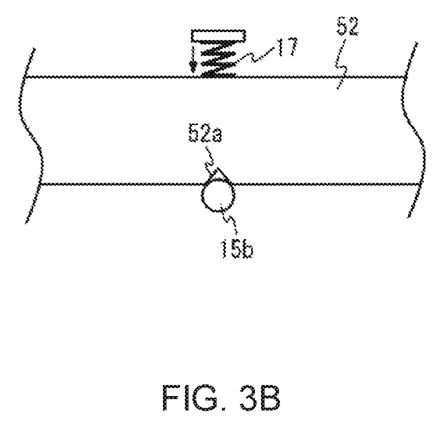
FIG. 3B is a schematic diagram for describing detailed configurations of the support part 15b and a peripheral part.

FIG. 3B is a schematic diagram for describing detailed configurations of the support part 15b and a peripheral part. As shown in FIG. 3B, the support part 15b is caught in a V-shaped groove 52a of the scale 52. Here, the diameter of the support part 15b is larger than the diameter of the support part 15a so that the support part 15b is caught in the groove 52a. It should be noted that the present invention is not so limited and, for example, the center of the support part 15b having the same diameter as that of the support part 15a may be located above the center of the support part 15a in the Z-axis direction. And, the support part 15b sandwiches the scale 52 with a spring 17. The spring 17 biases the scale 52 toward the support part 15b. As described above, because the scale 52 is not fixed to the side surface 12a and is supported by the support parts 15a and 15b, the scale 52 is not deformed even when the base 10 is deformed.

Figure 4:
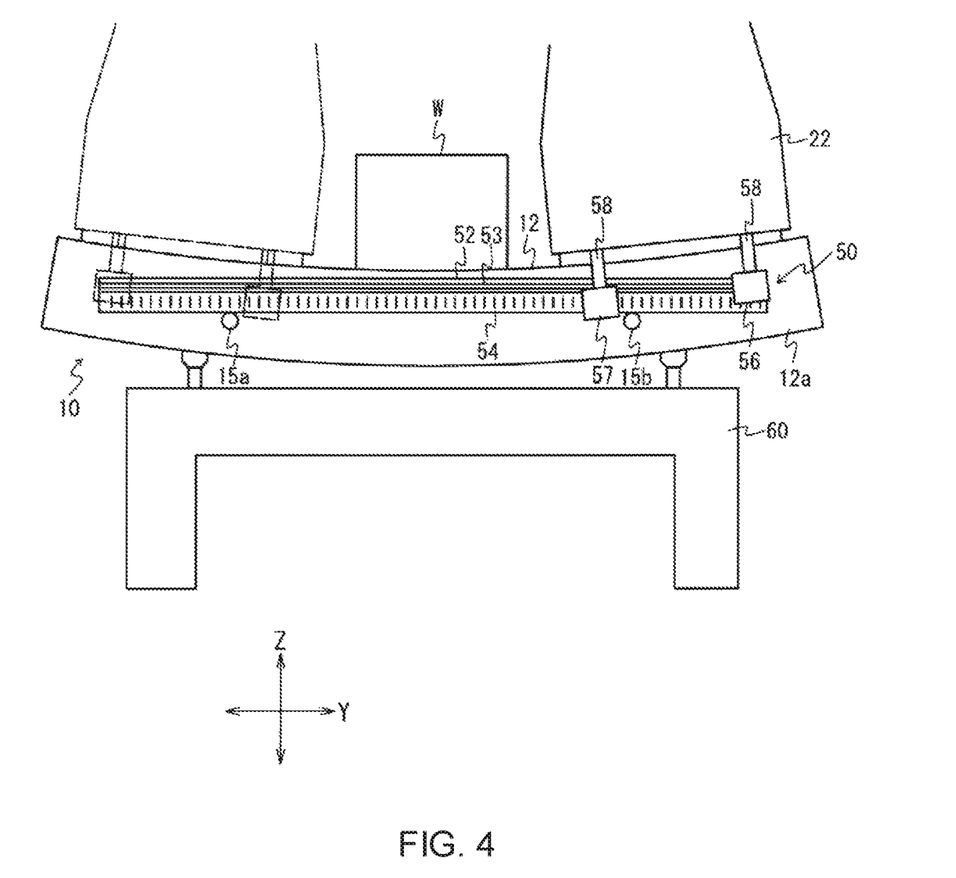
FIG. 4 is a diagram showing a state where the base 10 of FIG. 3A is deformed.

FIG. 4 is a diagram showing a state where the base 10 of FIG. 3A is deformed. Here, it is assumed that the base 10 (the guide part 12) is bent by the workpiece placed on the placement surface 11 (FIG. 1) of the base 10. As can be understood by comparing FIG. 3A and FIG. 4, when the base 10 is deformed, the two support parts 15a and 15b are displaced in the Z-axis direction.

It should be noted that, in the above description, the scale 52 is supported by the two support parts 15a and 15b, but the configuration for supporting the scale 52 may be other than the above. For example, the scale 52 may be supported by using a supporting means (for example, the supporting device 300 shown in FIG. 2 and the like) described in Japanese Patent No. 4722400. Such a supporting means can suppress the deformation from being transmitted to the scale 52 even when the guide part 12 is deformed.

Returning to FIG. 2, the scale 52 has first graduations 53 and second graduations 54. The first graduations 53 are formed in the upper half of the scale 52. The first graduations 53 are for specifying the displacement of the guide part 12 in the Z-axis direction. A plurality of first graduations 53 are formed at predetermined intervals along the Z-axis direction. Specifically, a plurality of straight lines parallel to the Y-axis direction are formed as the first graduations 53 at predetermined intervals in the Z-axis direction.

The second graduations 54 are formed in the lower half of the scale 52. The second graduations 54 are for specifying the position of the column 27 in the Y-axis direction. A plurality of second graduations 54 are formed at predetermined intervals along the Y-axis direction. Specifically, a plurality of straight lines parallel to the Z-axis direction are formed as the second graduations 54 at predetermined intervals in the Y-axis direction.

It should be noted that, in the above description, both of the first graduations 53 and the second graduations 54 are formed as straight lines, but it is not so limited and the first graduations 53 and the second graduations 54 may be formed in other forms. Further, in the above description, the first graduations 53 are formed on the upper half of the scale 52 and the second graduations 54 are formed on the lower half of the scale 52, but it is not so limited and the first graduations 53 may be formed on the lower half of the scale 52 and the second graduations 54 may be formed on the upper half of the scale 52.

The detectors 56 and 57 are separated from each other by a predetermined distance in the Y-axis direction. The detectors 56 and 57 are each connected to the column 22 via connection parts 58. Therefore, the detectors 56 and 57 move in conjunction with the column 22. The detectors 56 and 57 each detect displacement of the guide part 12 in the Y-axis direction and the Z-axis direction.

Figure 5:
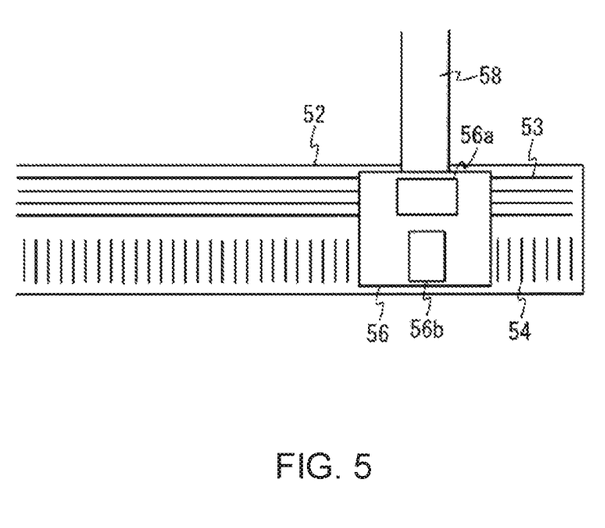
FIG. 5 is a diagram showing a configuration of a detector 56.

FIG. 5 is a diagram showing a configuration of the detector 56. The detector 56 has a first detection part 56a and a second detection part 56b. The first detection part 56a is provided on the upper side to face the first graduations 53, and the second detection part 56b is provided on the lower side to face the second graduations 54. By detecting the first graduations 53 with the first detection part 56a, it is possible to detect the displacement in the Z-axis direction with respect to the scale 52, and by detecting the second graduations 54 with the second detection part 56b, it is possible to detect the displacement in the Y-axis direction with respect to the scale 52. It should be noted that, in the above description, the first detection part 56a and the second detection part 56b are provided in one component, but it is not so limited and the first detection part 56a and the second detection part 56b each may be provided in independent components.

Figure 6:
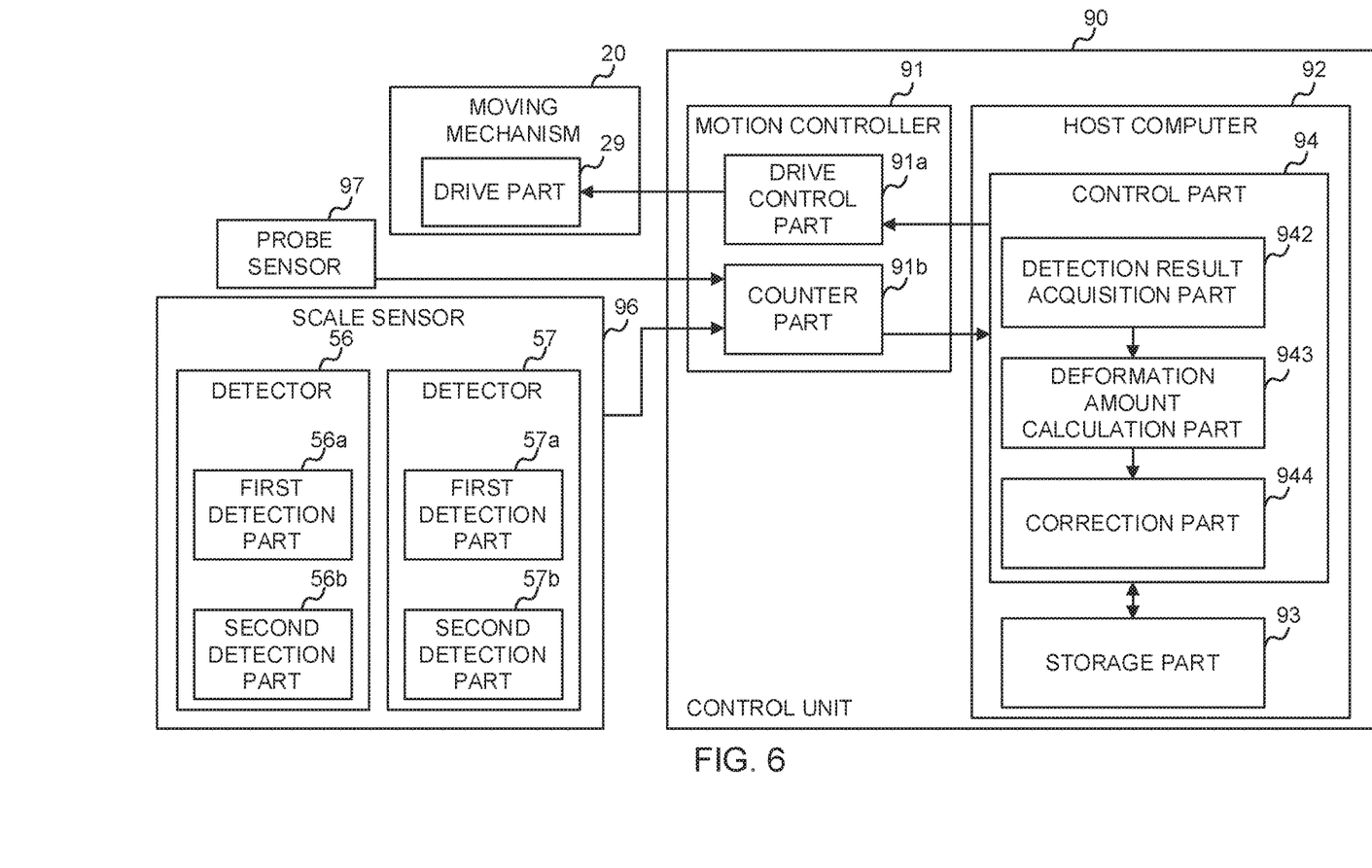
FIG. 6 is a block diagram for describing an example of a configuration of a control unit 90.

The detector 57 also includes a first detection part 57a and a second detection part 57b, as shown in FIG. 6 which will be described later. Because the first detection part 57a and the second detection part 57b have the same configurations as the first detection part 56a and the second detection part 56b of the detector 56, a detailed description thereof will be omitted.

By providing the above-described scale 52 and detectors 56 and 57, when the base 10 is deformed as shown in FIG. 4, the amount of displacement of the column 22 can be detected by comparing the detection results of the two detectors 56 and 57. Specifically, the amount of displacement of the column 22 in the Z-axis direction and the amount of rotational angle displacement around the X-axis can be detected by comparing the detection result of the first detection part 56a of the detector 56 with the detection result of the first detection part 57a of the detector 57.

<Configuration of the Control Unit>

The configuration of the control unit 90 is described with reference to FIG. 6. The control unit 90 acquires the relative amount of deformation of the guide part 12 with respect to the scale 52 on the basis of the detection results of the detectors 56 and 57, and performs a correction.

FIG. 6 is a block diagram for describing an example of a configuration of the control unit 90. The control unit 90 controls all operations of the coordinate measurement machine 1. The control unit 90 includes a motion controller 91 and a host computer 92.

The motion controller 91 executes control of the main body of the coordinate measurement machine 1. The motion controller 91 includes a drive control part 91a and a counter part 91b. The drive control part 91a executes drive control of a drive part 29 of a movement mechanism 20.

The counter part 91b counts the pulse signal outputted from the scale sensor 96 and the pulse signal outputted from the probe sensor 97 of the probe 28. For example, the counter part 91b includes a scale counter that measures the movement amount of the moving mechanism 20 in the X-axis, the Y-axis, and the Z-axis directions by counting the pulse signal outputted from the scale sensor 96, and includes a probe counter that measures the movement amount of the probe 28 in the X-axis, the Y-axis, and the Z-axis directions by counting the pulse signals outputted from the probe sensor 97. It should be noted that the scale sensor 96 shown in FIG. 6 includes the above-described detectors 56 and 57 of the linear encoder 50.

The host computer 92 gives a prescribed command to the motion controller 91 and executes arithmetic processing such as an analysis of the shape of the guide part 12 and the like. For example, the host computer 92 controls the main body of the coordinate measurement machine 1 by giving a command to the motion controller 91. The host computer 92 includes a storage part 93 and a control part 94.

The storage part 93 includes, for example, a Read Only Memory (ROM) and a Random Access Memory (RAM). The storage part 93 stores a program to be executed by the control part 94 and various types of data. For example, the storage part 93 stores the detection results of the detectors 56 and 57.

The control part 94 is, for example, a Central Processing Unit (CPU). The control part 94 controls the operation of the coordinate measurement machine 1 by executing the program stored in the storage part 93. The control part 94 functions as a detection result acquisition part 942, a deformation amount calculation part 943, and a correction part 944.

The detection result acquisition part 942 acquires the detection results of the detectors 56 and 57. Specifically, the detection result acquisition part 942 acquires (i) the detection results of the first detection part 56a and the second detection part 56b of the detector 56 and (ii) the detection results of the first detection part 57a and the second detection part 57b of the detector 57.

The deformation amount calculation part 943 is a deformation amount acquisition part that acquires the amount of deformation of the guide part 12 relative to the scale 52 on the basis of the detection results of the detectors 56 and 57. That is, the deformation amount calculation part 943 acquires the relative deformation amount of the guide part 12 on the basis of the detection results of the detectors 56 and 57 acquired by the detection result acquisition part 942.

The deformation amount calculation part 943 obtains the deformation amount of the guide part 12 by comparing the detection results detected by each of the detectors 56 and 57. Specifically, the deformation amount calculation part 943 obtains the deformation amount of the guide part 12 by comparing the detection result of the first detection part 56a of the detector 56 with the detection result detected by the first detection part 57a of the detector 57.

The correction part 944 has a function of correcting an error. In the present exemplary embodiment, the correction part 944 obtains a straightness error or an angular error of the guide part 12 for correction, on the basis of the amount of deformation of the guide part 12 obtained by the deformation amount calculation part 943. The correction part 944 executes a correction calculation of the obtained error as a spatial correction parameter.

<Effect of the Present Exemplary Embodiment>

The above-described coordinate measurement machine 1 has detectors 56 and 57 for detecting relative displacement with respect to the scale 52 supported on the side surface 12a of the guide part 12. The detectors 56 and 57 are provided on the column 22, and detect the displacement of the column 22 in the Y-axis direction and the Z-axis direction. And, the amount of deformation of the guide part 12 relative to the scale 52 is acquired on the basis of the deter result of the displacement of the column 22. According to the above-described configuration, even when the guide part 12 is deformed, the amount of deformation of the guide part 12 for guiding the column 22 can be obtained easily and with high accuracy by detecting the displacement of the column 22 using the scale 52 and the detectors 56 and 57.

Modification Examples

Hereinafter, modification examples of the above-described coordinate measurement machine 1 are described with reference to FIGS. 7 to 9.

Figure 7:
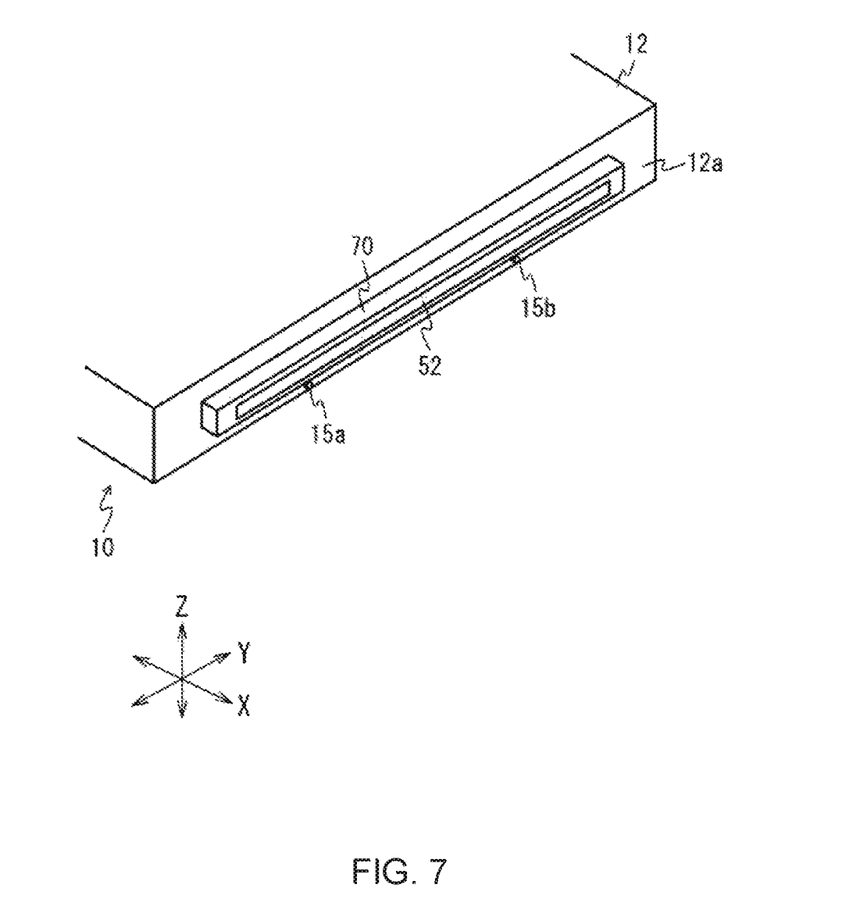
FIG. 7 is a diagram for describing a configuration according to a first modification example.

FIG. 7 is a diagram for describing a configuration according to a first modification example. In the above description, the scale 52 is supported by the support parts 15a and 15b (see FIG. 3A), but in the first modification example, the case member 70, to which the scale 52 is fixed, is supported by the support parts 15a and 15b as shown in FIG. 7.

The case member 70 is point-supported by the support parts 15a and 15b so that the case member 70 can be displaced in the Z-axis direction in a state where the case member 70 is parallel to the Y-axis direction. As a result, similarly to the above-described exemplary embodiment, the amount of displacement of the column 22 can be appropriately acquired. In addition, the case member 70 has a block shape. The case member 70 is made of a material having high rigidity and small thermal deformation, and the case member herein is made of ceramics. In such a case, the straightness deformation due to temperature bias is small even if there is a temperature change. Further, the error due to vibration also becomes small because the rigidity is high.

Figure 8:
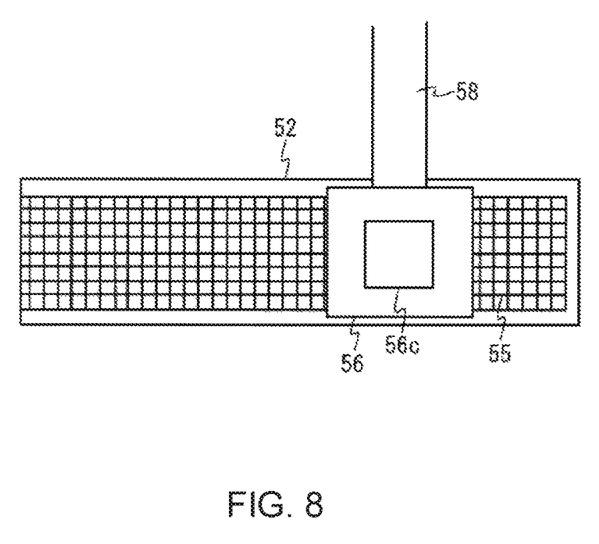
FIG. 8 is a diagram for describing a configuration according to a second modification example.

FIG. 8 is a diagram for describing a configuration according to a second modification example. In the above description, the first graduations 53 and the second graduations 54 of the scale 52 are formed separately (see FIG. 5), but in the second modification example, graduations 55, which are formed to intersect with each other, are provided as shown in FIG. 8. In such a case, it is possible to downsize the detectors 56 and 57 because one detection part (a detection part 56c shown in FIG. 8) of the detectors 56 and 57 detects the graduations 55.

Figure 9:
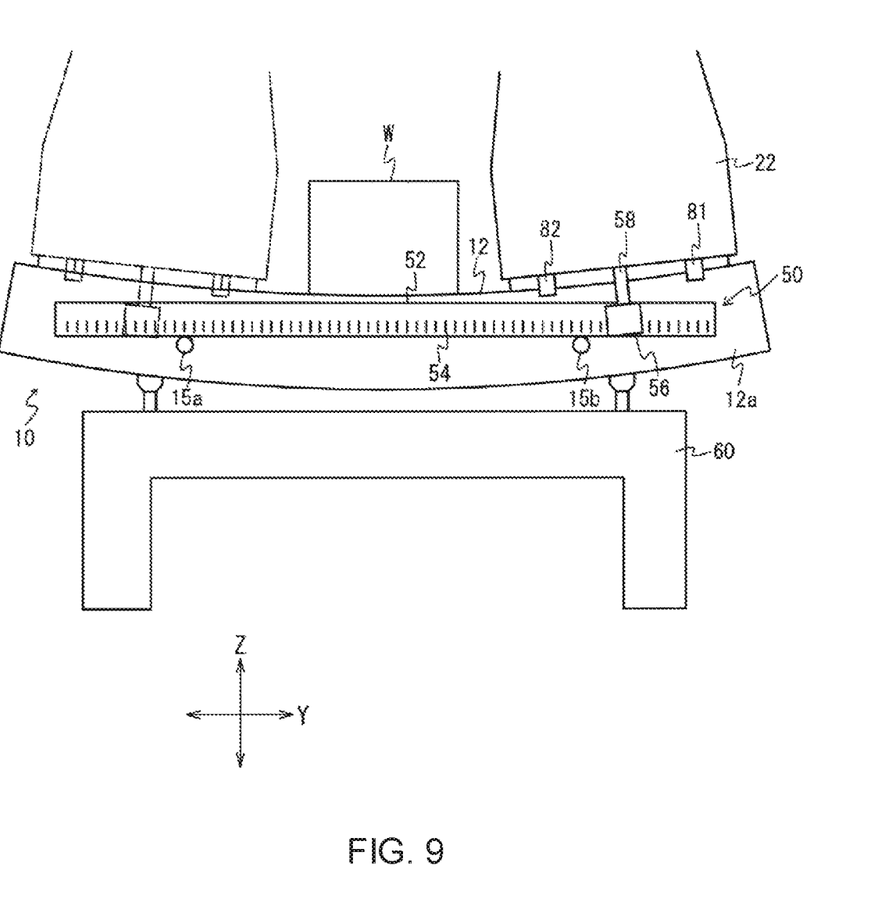
FIG. 9 is a diagram for describing a configuration according to a third modification example.

FIG. 9 is a diagram for describing a configuration according to a third modification example. In the above description, the first detection part 56a of the detector 56 and the first detection part 57a of the detector 57 detect the first graduations 53 of the scale 52, but in the third modification example, proximity sensors 81 and 82 are provided instead of the first detection parts 56a and 57a. The proximity sensors 81 and 82 are attached to the column 22 and are separated from the scale 52. It should be noted that the detectors 56 and 57 have second detectors 56b and 57b (see FIG. 6).

Each of the proximity sensors 81 and 82 is a distance detection sensor that detects a distance to the scale 52 (for example, a distance in the Z-axis direction). In such a case, the deformation amount calculation part 943 can obtain the amount of deformation of the guide part 12 in the Z-axis direction by comparing the detection results of the proximity sensors 81 and 82. In addition, by providing the proximity sensors 81 and 82, it is not necessary to provide the first graduations 53 on the scale 52.

Figure 10:
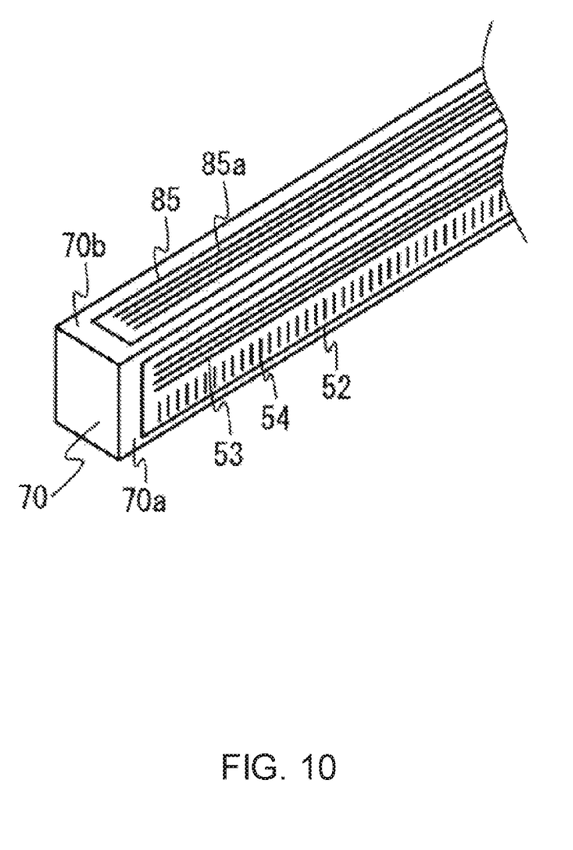
FIG. 10 is a schematic diagram for describing a configuration according to a fourth modification example.

FIG. 10 is a schematic diagram for describing a configuration according to a fourth modification example. In the above-described first modification example, the scale having the first graduations 53 formed at predetermined intervals along the Z-axis direction and the second graduations 54 formed at predetermined intervals along the Y-axis is fixed to the case member 70. In the fourth modification example, in contrast with the above example, a second scale 85 having the third graduations 85a formed at predetermined intervals along the X-axis direction is also fixed to the member 70 in addition to the scale 52 as shown in FIG. 10. Specifically, the scale 52 is fixed to the side surface 70a of the case member 70, and the second scale 85 is fixed to the upper surface 70b of the case member 70. It should be noted that a detector, which is not shown in FIG. 10, having a similar configuration as that of the detectors 56 and 57, detects the third graduations 85a that face the detector.

In a case where the second scale 85 is provided in addition to the scale 52, when the guide part 12 is deformed by bulging in the X-axis direction, the bulge of the guide part 12 in the X-axis direction can also be detected. This makes it possible to obtain the amount of deformation of the guide part 12 with higher accuracy.

It should be noted that, in the above description, the coordinate measurement machine 1 has been described as an industrial machine, but it is not so limited. For example, the industrial machine may be a machine tool, a robot, or the like. Further, in the above description, the guide part 12 is provided along the Y-axis direction, but it is not so limited and the guide part 12 may be provided along the X-axis direction.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. An industrial machine comprising:
   a movable body that can move relative to a placement surface on which a workpiece is placed;
   a guide part that is provided on the placement surface, the guide part guiding the movable body;
   a scale of a linear encoder that is supported on a side surface of the guide part;
   detectors that are provided on the movable body, the detectors detecting a relative displacement with respect to the scale and a displacement of the movable body in each of a moving direction and a vertical direction; and
   a deformation amount acquisition part that acquires an amount of deformation of the guide part relative to the scale on the basis of detection results of the detectors.

2. The industrial machine according to claim 1, wherein
   the plurality of detectors are provided along the moving direction, and
   the deformation amount acquisition part obtains an amount of deformation of the guide part by comparing the detection results detected by each of the plurality of detectors.

3. The industrial machine according to claim 2, wherein
   the scale is provided with a plurality of first graduations formed at predetermined intervals along the vertical direction, and
   the deformation amount acquisition part obtains an amount of deformation of the guide part by comparing the values of first graduations detected by each of the plurality of detectors.

4. The industrial machine according to claim 3, wherein
   the scale is formed with a plurality of second graduations, formed at predetermined intervals along the moving direction, for specifying a position of the movable body in the moving direction.

5. The industrial machine according to claim 4, wherein
   each of the plurality of detectors includes the first detection parts that detect the first graduations and the second detection parts that detect the second graduations.

6. The industrial machine according to claim 2, wherein
   the detectors are distance detection sensors for detecting a distance to the scale, and
   the deformation amount acquisition part obtains an amount of deformation of the guide part by comparing the distance detected by each of the plurality of distance detection sensors.

7. The industrial machine according to claim 1, wherein
   the side surface of the guide part is provided with a plurality of support parts for point-supporting the scale in the moving direction.

8. The industrial machine according to claim 7, wherein
   the plurality of support parts include a constraining support part for supporting one end side in the longitudinal direction of the scale while the one end side is constrained and a non-constraining support part for supporting the other end side in the longitudinal direction of the scale while the other end is not constrained.

9. The industrial machine according to claim 1, wherein
   the scale is fixed to a case that is supported by the guide part, the case being configured to be displaced in the vertical direction in a state where the case is parallel to the moving direction.

10. The industrial machine according to claim 1, further comprising:
   a correction part that obtains a straightness error or an angular error of the guide part for a correction on the basis of an amount of deformation of the guide part obtained by the deformation amount acquisition part.

* * * * *